(12) United States Patent
Zhuang et al.

(10) Patent No.: US 12,405,513 B2
(45) Date of Patent: Sep. 2, 2025

(54) OPTICAL SYSTEM

(71) Applicant: TDK TAIWAN CORP., Taoyuan (TW)

(72) Inventors: Po-Xiang Zhuang, Taoyuan (TW); Wei-Jhe Shen, Taoyuan (TW); Ko-Lun Chao, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 181 days.

(21) Appl. No.: 18/318,243

(22) Filed: May 16, 2023

(65) Prior Publication Data

US 2023/0367179 A1    Nov. 16, 2023

Related U.S. Application Data

(60) Provisional application No. 63/342,285, filed on May 16, 2022.

(51) Int. Cl.
*G03B 9/42* (2021.01)
*G03B 30/00* (2021.01)

(52) U.S. Cl.
CPC .............. *G03B 9/42* (2013.01); *G03B 30/00* (2021.01); *G03B 2205/0069* (2013.01)

(58) Field of Classification Search
CPC ........ G03B 35/00; G03B 35/08; G03B 19/22; H04N 13/239; H04N 13/243; H04N 23/698
See application file for complete search history.

(56) References Cited

U.S. PATENT DOCUMENTS

2022/0121086 A1*  4/2022  Wang .................. G03B 11/043
2023/0027221 A1*  1/2023  Ushio .................. G06F 1/1616

* cited by examiner

*Primary Examiner* — Noam Reisner
(74) *Attorney, Agent, or Firm* — Muncy, Geissler, Olds & Lowe, P.C.

(57) ABSTRACT

An optical system includes a first optical mechanism, a second optical mechanism and a third optical mechanism. The first optical mechanism includes a movable part, a fixed assembly, and a driving assembly. The movable part is movable relative to the fixed assembly. The driving assembly is configured to drive the movable part to move relative to the fixed assembly. When viewed along a first axis, a base of the fixed assembly is disposed between the second optical mechanism and the third optical mechanism.

20 Claims, 8 Drawing Sheets

OPTICAL SYSTEM

CROSS REFERENCE TO RELATED APPLICATIONS

This application claims the benefit of U.S. Provisional Application No. 63/342,285, filed May 16, 2022, the entirety of which is incorporated by reference herein.

BACKGROUND OF THE INVENTION

Field of the Disclosure

The present disclosure relates to an optical system, and in particular it relates to an optical system with a shutter structure.

Description of the Related Art

As technology has developed, many of today's electronic devices (such as smartphones) have a camera, and offer video functionality. Using the camera modules disposed on electronic devices, users can operate their electronic devices to capture photographs and record videos.

Today's design of electronic devices continues to follow the trend of miniaturization, meaning that the various components of the camera module or its structure must also be continuously reduced, so as to achieve miniaturization. In general, a driving mechanism in the camera module has a camera lens and a shutter mechanism. However, although the existing driving mechanism can achieve the aforementioned functions of photographing or video recording, they still cannot meet all the needs of the users.

Therefore, how to design a camera module capable of capturing images and capable of achieving miniaturization are topics nowadays that need to be discussed and solved.

BRIEF SUMMARY OF THE INVENTION

Accordingly, one objective of the present disclosure is to provide an optical system to solve the above problems.

According to some embodiments of the disclosure, an optical system is provided and includes a first optical mechanism, a second optical mechanism and a third optical mechanism. The first optical mechanism includes a movable part, a fixed assembly, and a driving assembly. The movable part is movable relative to the fixed assembly. The driving assembly is configured to drive the movable part to move relative to the fixed assembly. When viewed along the first axis, the base of the fixed assembly is disposed between the second optical mechanism and the third optical mechanism.

According to some embodiments, the fixed assembly includes a first opening and a second opening. The first opening is configured to allow a first light beam to pass through to enter the second optical mechanism. The second opening is configured to allow a second light beam to pass through to enter the third optical mechanism. The first light beam is parallel to the second light beam. The second optical mechanism includes a camera module configured to capture an image. The third optical mechanism includes a depth-sensing module configured to measure distance. When viewed along the first axis, the first opening and the second opening are arranged along a second axis. The first axis is parallel to the first light beam. The second axis is perpendicular to the first axis.

According to some embodiments, when viewed along the first axis, the driving assembly is located between the second optical mechanism and the third optical mechanism. The optical system further includes a base plate, and the base of the first optical mechanism, the second optical mechanism and the third optical mechanism are fixedly disposed on the base plate and located on the same plane. When viewed along the first axis, the third optical mechanism, the base and the second optical mechanism are arranged along the second axis in sequence. When viewed along the first axis, the fixed assembly has a long strip-shaped structure extending along the second axis.

According to some embodiments, the fixed assembly further includes an outer frame fixedly connected to the base. When viewed along the first axis, the outer frame has a long strip-shaped structure extending along the second axis. The outer frame has a base portion, a first bending portion and a second bending portion. The base portion extends along the second axis. The first bending portion and the second bending portion are formed on opposite ends along the second axis of the base portion. The first bending portion and the second bending portion extend along the first axis.

According to some embodiments, when viewed along a third axis, there is a gap between the first bending portion and the base plate. The third axis is perpendicular to the first axis and the second axis. When viewed along a third axis, there is another gap between the second bending portion and the base plate. The outer frame further has a first side portion and a second side portion. The first side portion and the second side portion are formed on opposite sides along the third axis of the base portion. The first side portion and the second side portion extend along the second axis and are configured to strengthen the structural strength of the outer frame.

According to some embodiments, the first bending portion and the base form a first accommodation space. At least part of the second optical mechanism is located in the first accommodation space. The second bending portion and the base form a second accommodation space. At least a part of the third optical mechanism is located in the second accommodation space.

According to some embodiments, the base includes a first base body and a second base body. The first base body is connected to the second base body in a detachable manner. The first base body forms a first coupling structure. The second base body forms a second coupling structure corresponding to the first coupling structure. The first coupling structure is configured to be coupled to the second coupling structure so that the first base body is fixedly connected to the second base body. The first coupling structure includes one of a positioning column and a positioning hole. The second coupling structure includes the other one of the positioning column and the positioning hole.

According to some embodiments, when viewed along the third axis, the total height of the first base body and the second base body relative to the base plate is greater than the height of the third optical mechanism relative to the base plate. The driving assembly includes a coil, a magnetic element and a magnetically conductive element. The magnetic element corresponds to the coil. The magnetically conductive element corresponds to the coil and has a magnetically conductive material. The coil surrounds the magnetically conductive element. The magnetically conductive element has a plate-shaped structure and is parallel to the second axis. The first base body further has an accommodating groove configured to accommodate the magnetically conductive element and the coil. When viewed along the third axis, the second base body does not overlap the coil.

According to some embodiments, the first optical mechanism further includes a first circuit member and a second circuit member which are disposed at the first base body. The first circuit member has a first electrical connection portion and a first welding portion. The first electrical connection portion and the first welding portion are exposed from the first base body. The second circuit member has a second electrical connection portion and a second welding portion. The second electrical connection portion and the second welding portion are exposed from the first base body. When viewed along the first axis, the first electrical connection portion and the first welding portion are located on both sides of the first base body. When viewed along the first axis, the second electrical connection portion and the second welding portion are located on both sides of the first base body.

According to some embodiments, the first leading end of the coil is configured to connect to the first welding portion. A first heat-in98ijsulation portion is disposed between the first welding portion and the main body of the coil. The second leading end of the coil is configured to connect to the second welding portion. A second heat-insulation portion is disposed between the second welding portion and the main body of the coil. The first heat-insulation portion, the second heat-insulation portion and the first base body are integrally formed as one piece.

According to some embodiments, when the coil is disposed in the accommodating groove, a first accommodating subspace is formed between the main body and the first base body. The first optical mechanism further includes a first adhesive element filled in the first accommodating subspace configured to affix the main body to the first base body. When viewed along the first axis, the first adhesive element completely overlaps the main body of the coil.

According to some embodiments, the first optical mechanism further includes a second adhesive element disposed between the first base body and the second base body. The second adhesive element is configured to affix the first base body to the second base body. The thermal conductivity coefficient of the first adhesive element is different from the thermal conductivity coefficient of the second adhesive element.

According to some embodiments, the first base body further has two exposing portions connected to the accommodating groove. When viewed along the third axis, the coil overlaps the two exposing portions. The outer frame further has two connection structures extending along the first axis. After the outer frame covers the first base body, the two connection structures cover the two exposing portions.

According to some embodiments, after the outer frame covers the first base body, a second accommodating subspace is formed between the two connection structures and the main body and is connected to the first accommodating subspace. The first adhesive element is disposed in the second accommodating subspace and contacts the two connection structures.

According to some embodiments, when the movable part is located at a first preset position relative to the fixed assembly and when viewed along the first axis, the movable part does not overlap with the first opening. When the movable part is located at the first preset position and when viewed along the first axis, the movable part does not overlap the second opening. The movable part includes a holding portion, a first side end portion and a second side end portion. The holding portion is configured to hold the magnetic element. When viewed along the first axis, the holding portion is connected between the first side end portion and the second side end portion. When viewed along the first axis, the driving assembly is located between the first opening and the second opening.

According to some embodiments, when viewed along the first axis, the length of the second side end portion along the second axis is different from the length of the first side end portion along the second axis. When viewed along the first axis, the length of the second side end portion along the second axis is greater than the length of the first side end portion along the second axis. When viewed along the first axis, the width of the second side end portion along the third axis is different from the width of the first side end portion along the third axis. When viewed along the first axis, the width of the second side end portion along the third axis is greater than the width of the first side end portion along the third axis.

According to some embodiments, a third opening is formed on the second side end portion. When the movable part is located at the first preset position and when viewed along the first axis, the second opening overlaps the third opening. The size of the first opening is the same as the size of the second opening. The size of the third opening is larger than the size of the second opening. The second optical mechanism has a second camera lens corresponding to the first opening. The third optical mechanism has a third camera lens corresponding to the second opening.

According to some embodiments, when viewed along the first axis, the distance between the first opening and the first bending portion along the second axis is different from the distance between the second opening and the second bending portion along the second axis. When viewed along the first axis, the distance between the first opening and the first bending portion along the second axis is smaller than the distance between the second opening and the second bending portion along the second axis.

According to some embodiments, when the movable part is located at a second preset position relative to the fixed assembly and when viewed along the first axis, the movable part overlaps the first opening. When the first movable part is located at the second preset position and when viewed along the first axis, the movable part overlaps the second opening. The movable part further includes a first shading element and a second shading element respectively disposed on the first side end portion and the second side end portion. The first shading element and the second shading element are made of light-absorbing material. The second shading element is adjacent to the third opening. When the first movable part is located at the second preset position and viewed along the first axis, the first shading element and the second shading element respectively cover the first opening and the second opening.

According to some embodiments, the third optical mechanism further includes a third camera lens and a third base. The third camera lens is disposed on the third base and is located between the movable part and the third base. The third optical mechanism further includes a supporting member disposed on the third base and configured to support the movable part. The supporting member sheathes the third camera lens. The supporting member has a ring structure. The supporting member is made of a light-absorbing material.

The present disclosure provides an optical system, including a first optical mechanism, a second optical mechanism and a third optical mechanism, and the outer frame of the first optical mechanism has a first opening and a second opening respectively corresponding to the second optical mechanism and third optical mechanism. In some embodiments, the driving assembly of the first optical mechanism can drive the movable part to move to selectively shield or not shield the first opening and the second opening at the same time.

In some embodiments, the base of the first optical mechanism can include a first base body and a second base body. The second base body can increase the height of the first base body relative to the base plate, so that the first optical mechanism is suitable for a higher camera lens module (such as the third optical mechanism).

In addition, the first base body has two exposing portions. When the outer frame is covered on the first base body, the first adhesive element can be connected to the two connection structures of the outer frame through the two exposing portions. Based on this design, the heat generated by the coil can be conducted to the outer frame made of metal through the first adhesive element, so as to achieve the advantage of rapid heat dissipation.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
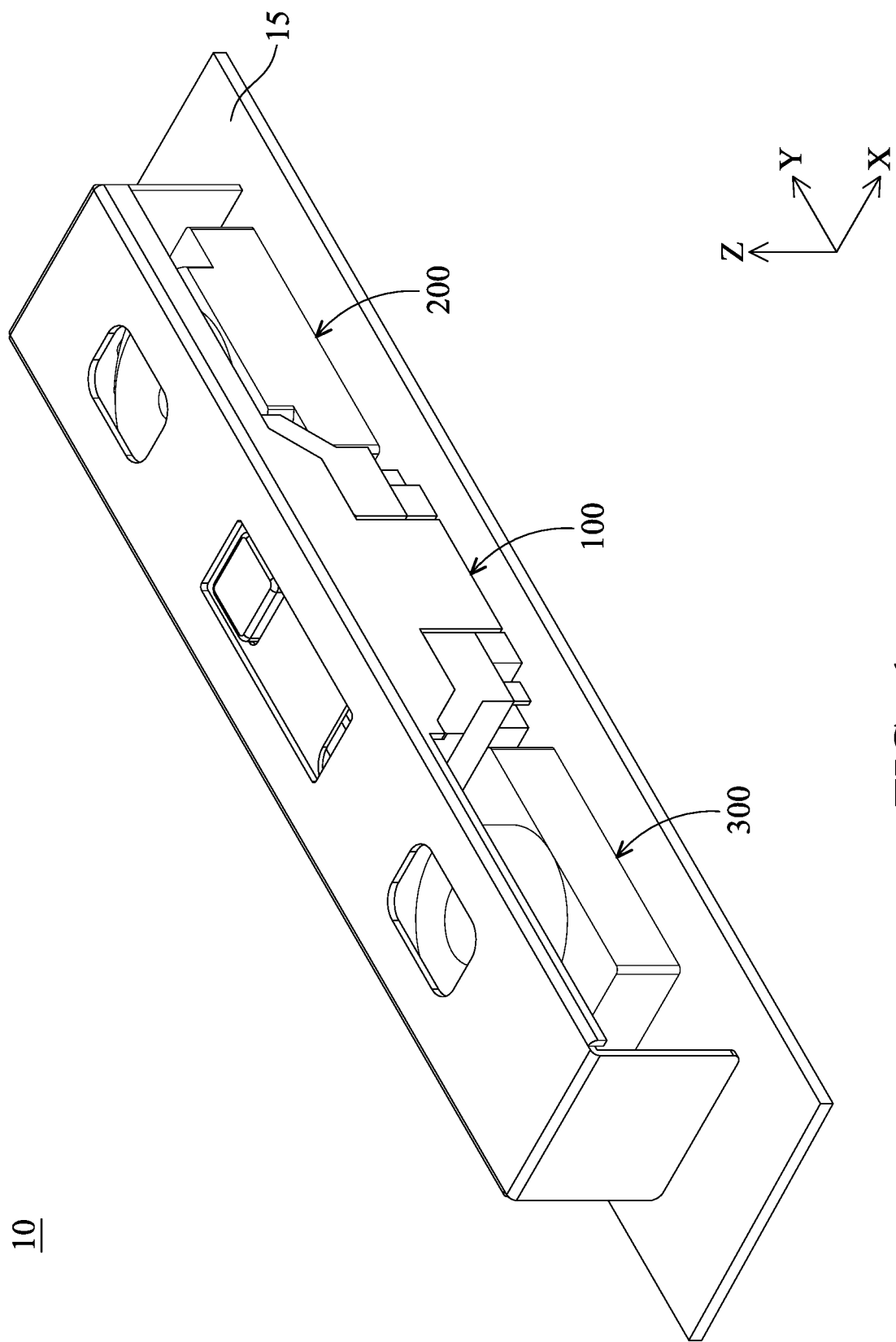
FIG. 1 is a perspective view of an optical system 10 according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
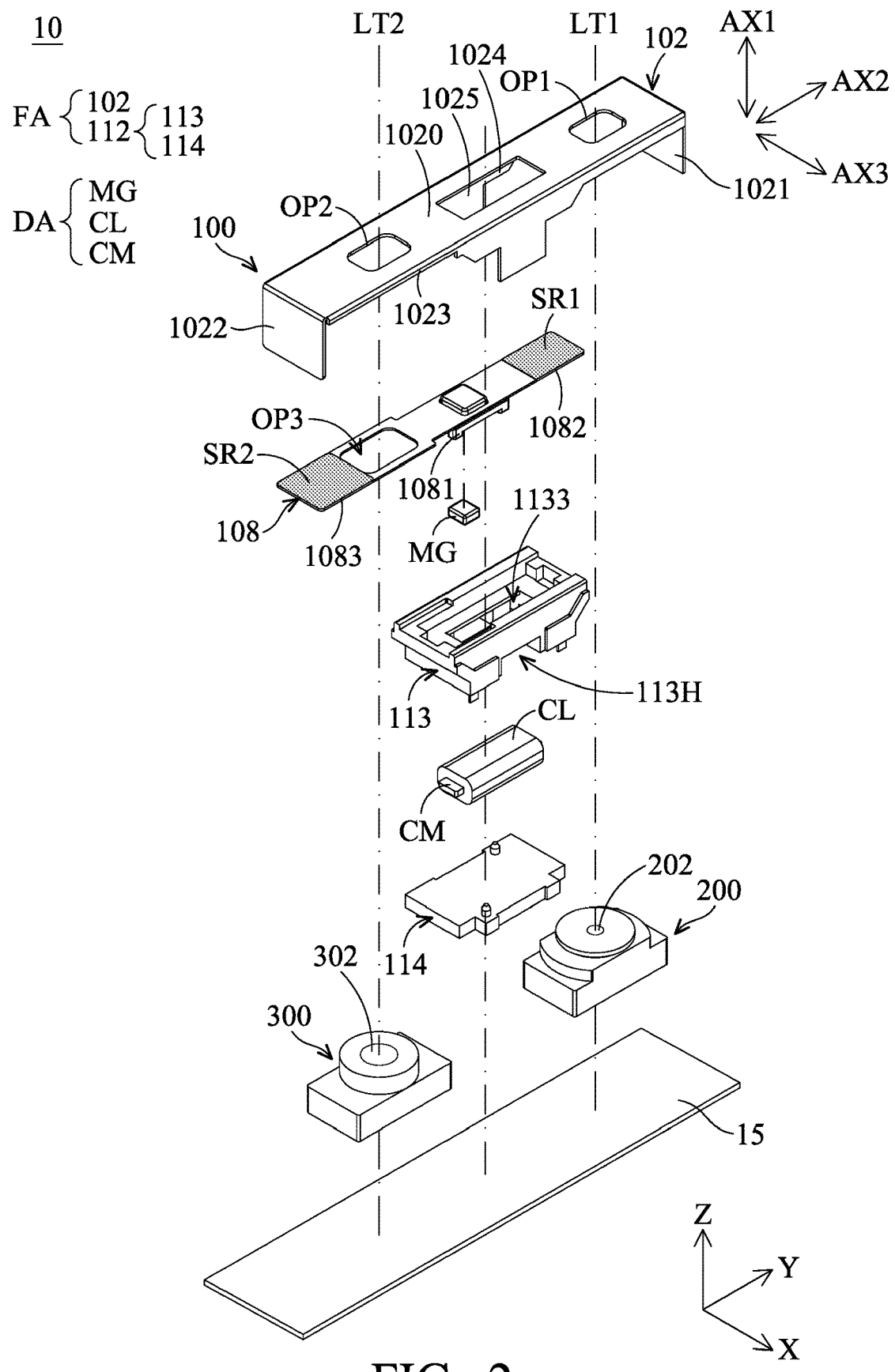
FIG. 2 is an exploded diagram of the optical system 10 according to an embodiment of the present disclosure.
Figure 3:
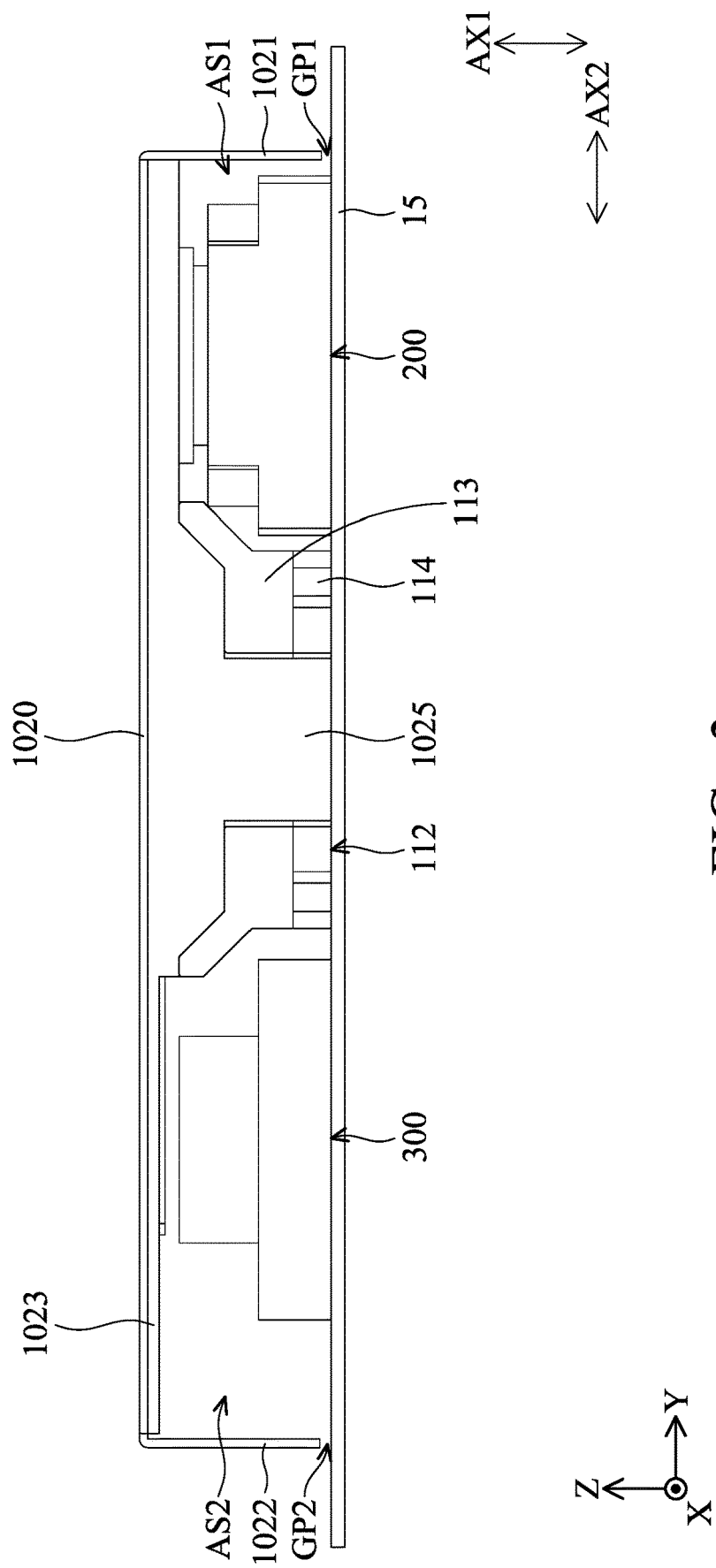
FIG. 3 is a side view of the optical system 10 according to an embodiment of the present disclosure.

Please refer to FIG. 1 to FIG. 3. FIG. 1 is a perspective view of an optical system 10 according to an embodiment of the present disclosure, FIG. 2 is an exploded diagram of the optical system 10 according to an embodiment of the present disclosure, and FIG. 3 is a side view of the optical system 10 according to an embodiment of the present disclosure. The optical system 10 may be an optical camera module configured to hold and drive at least one optical element. The optical system 10 can be installed in various electronic devices or portable electronic devices, such as a smart phone or notebook computer, for users to perform image capturing functions.

In this embodiment, the optical system 10 may include a base plate 15, a first optical mechanism 100, a second optical mechanism 200, and a third optical mechanism 300. The base plate 15 is, for example, a main circuit board of a portable electronic device, but it is not limited thereto. The first optical mechanism 100, the second optical mechanism 200, and the third optical mechanism 300 are disposed on the base plate 15 and located on the same plane. It should be noted that the size of the base plate 15 is not limited to the size illustrated in the figures.

The first optical mechanism 100 may include a fixed assembly FA, a movable part 108 and a driving assembly DA. In this embodiment, as shown in FIG. 2, the fixed assembly FA includes an outer frame 102 and a base 112, and the movable part 108 can serve as a light-shielding plate or a shutter, but it is not limited thereto. In other embodiments, the movable part 108 can also serve as a filter or an aperture.

The outer frame 102 is fixedly disposed on and connected to the base 112, and the outer frame 102 and the base 112 can be combined with each other to accommodate the movable part 108 and the driving assembly DA. The movable part 108 is movable relative to the fixed assembly FA, and the driving assembly DA is configured to drive the movable part 108 to move relative to the fixed assembly FA.

The outer frame 102 of the fixed assembly FA may include a first opening OP1 and a second opening OP2. The first opening OP1 is configured to allow a first light beam LT1 to pass through to enter the second optical mechanism 200, and the second opening OP2 is configured to allow a second light beam LT2 to pass through to enter the third optical mechanism 300. The first light beam LT1 is parallel to the second light beam LT2, and the first light beam LT1 is, for example, parallel to the Z-axis.

In this embodiment, the second optical mechanism 200 may be a camera module configured to receive the first light beam LT1 to capture an image. The third optical mechanism 300 may be a depth-sensing module configured to receive the second light beam LT2 to measure the distance between an object and the optical system 10. When viewed along a first axis AX1, the base 112 is disposed between the second optical mechanism 200 and the third optical mechanism 300.

Figure 4:
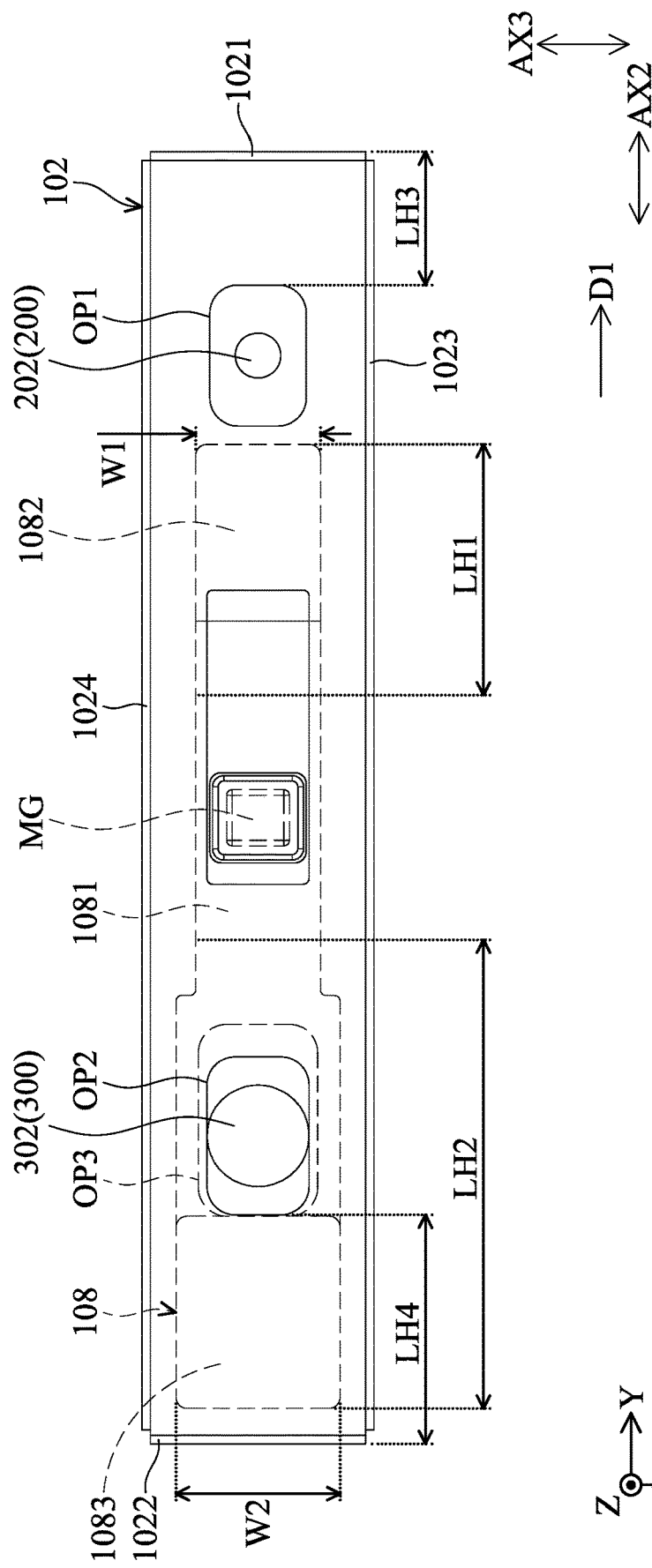
FIG. 4 is a top view of the movable part 108 located in a first preset position according to an embodiment of the present disclosure.
Figure 5:
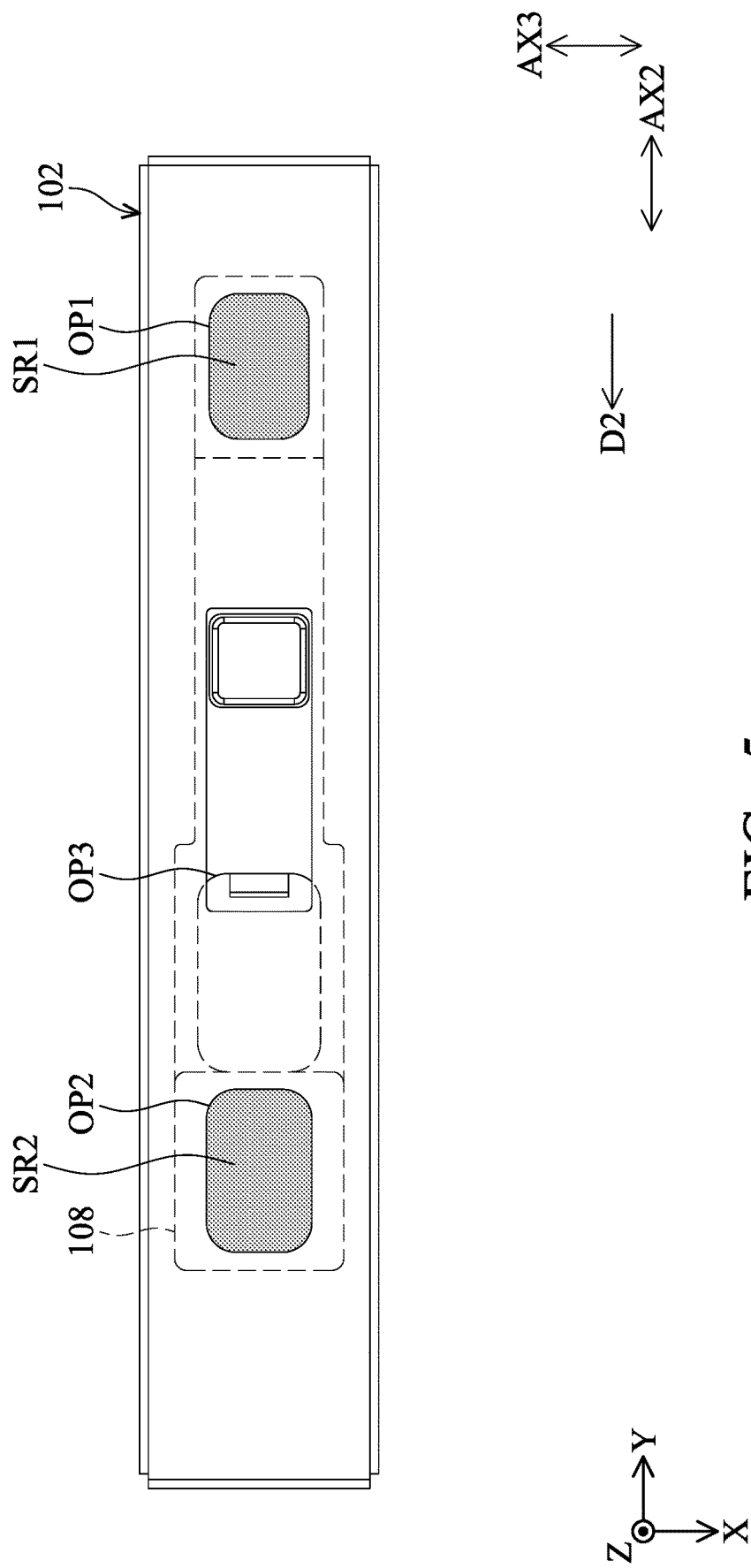
FIG. 5 is a top view of the movable part 108 located in a second preset position according to an embodiment of the present disclosure.

Next, please refer to FIG. 1 to FIG. 5. FIG. 4 is a top view of the movable part 108 located in a first preset position according to an embodiment of the present disclosure, and FIG. 5 is a top view of the movable part 108 located in a second preset position according to an embodiment of the present disclosure. When viewed along the first axis AX1 (the Z-axis), the first opening OP1 and the second opening OP2 are arranged along a second axis AX2. The first axis AX1 is parallel to the first light beam LT1, and the second axis AX2 is perpendicular to the first axis AX1.

As shown in FIG. 4, when viewed along the first axis AX1, the driving assembly DA is located between the second optical mechanism 200 and the third optical mechanism 300. In addition, as shown in FIG. 3, when viewed along a third axis AX3, the third optical mechanism 300, the base 112 and the second optical mechanism 200 are arranged along the second axis AX2 in sequence. The third axis AX3 is perpendicular to the first axis AX1 and the second axis AX2.

As shown in FIG. 4, when viewed along the first axis AX1, the fixed assembly FA has a long strip-shaped structure extending along the second axis AX2. Specifically, when viewed along the first axis AX1, the outer frame 102 has a long strip-shaped structure extending along the second axis AX2.

In this embodiment, the driving assembly DA includes a coil CL, a magnetic element MG and a magnetically conductive element CM. The magnetic element MG corresponds to the coil CL, and the magnetically conductive element CM corresponds to the coil CL and has a magnetically conductive material.

The coil CL surrounds the magnetically conductive element CM, and the magnetically conductive element CM has a plate-shaped structure and is perpendicular to the third axis AX3. Specifically, the magnetically conductive element CM with a long strip-shaped structure extends along the second axis AX2. Furthermore, the first base body 113 of the base 112 has an accommodating groove 1133 configured to accommodate the magnetically conductive element CM and the coil CL. In contrast, the magnetic element MG is accommodated in the movable part 108.

In this embodiment, the optical system 10 can selectively shield or not shield the first opening OP1 and the second opening OP2. For example, when the movable part 108 is located at the first preset position in FIG. 4 relative to the fixed assembly FA, and when viewed along the first axis AX1, the movable part 108 does not overlap the first opening OP1. When the movable part 108 is located at the first preset position, and when viewed along the first axis AX1, the movable part 108 does not overlap the second opening OP2.

On the other hand, when the first opening OP1 and the second opening OP2 are to be closed together, the coil CL can receive a current to act with the magnetic element MG to generate an electromagnetic driving force to drive the movable part 108 to move along a first direction D1 from the first preset position in FIG. 4 to the second preset position in FIG. 5.

When the movable part 108 is located at the second preset position in FIG. 5 relative to the fixed assembly FA, and when viewed along the first axis AX1, the movable part 108 overlaps the first opening OP1. When the movable part 108 is located at the second preset position, and when viewed along the first axis AX1, the movable part 108 does not overlap the second opening OP2. Based on the configuration, the function of the aperture switch can be achieved.

When the first opening OP1 and the second opening OP2 are to be opened again, the driving assembly DA can generate an electromagnetic driving force in the opposite direction to drive the movable part 108 to move along a second direction D2 from the second preset position in FIG. 5 to the first preset position in FIG. 4. The first direction D1 is opposite to the second direction D2.

Next, the specific structure of each element are described below. As shown in FIG. 3, in this embodiment, the outer frame 102 has a base portion 1020, a first bending portion 1021 and a second bending portion 1022. The base portion 1020 extends along the second axis AX2, the first bending portion 1021 and the second bending portion 1022 are formed on opposite ends along the second axis AX2 of the base portion 1020, and the first bending portion 1021 and the second bending portion 1022 extend along the first axis AX1.

As shown in FIG. 3, when viewed along the third axis AX3, there is a gap GP1 between the first bending portion 1021 and the base plate 15. When viewed along the third axis AX3, there is a gap GP2 between the second bending portion 1022 and the base plate 15. The size of the gap GP1 is substantially equal to the size of the gap GP2, but it is not limited thereto.

Furthermore, as shown in FIG. 2, the outer frame 102 further has a first side portion 1023 and a second side portion 1024. The first side portion 1023 and the second side portion 1024 are formed on opposite sides along the third axis AX3 of the base portion 1020, and the first side portion 1023 and the second side portion 1024 extend along the first axis AX1 and the second axis AX2 and are configured to strengthen the structural strength of the outer frame 102.

As shown in FIG. 3, the first bending portion 1021 and the base 112 form a first accommodation space AS1, and at least a part of the second optical mechanism 200 is located in the first accommodation space AS1. Similarly, the second bending portion 1022 and the base 112 form a second accommodation space AS2, and at least a part of the third optical mechanism 300 is located in the second accommodation space AS2.

Furthermore, the movable part 108 may include a holding portion 1081, a first side end portion 1082 and a second side end portion 1083. The holding portion 1081 is configured to hold the magnetic element MG. When viewed along the first axis AX1, the holding portion 1081 is connected between the first side end portion 1082 and the second side end portion 1083.

Because the magnetic element MG is accommodated in the bottom of the holding portion 1081, when viewed along the first axis AX1, the magnetic element MG of the driving assembly DA is located between the first opening OP1 and the second opening OP2.

As shown in FIG. 4, when viewed along the first axis AX1, a length LH2 of the second side end portion 1083 along the second axis AX2 is different from a length LH1 of the first side end portion 1082 along the second axis AX2. When viewed along the first axis AX1, the length LH2 of the second side end portion 1083 along the second axis AX2 is greater than the length LH1 of the first side end portion 1082 along the second axis AX2.

When viewed along the first axis AX1, a width W2 of the second side end portion 1083 along the third axis AX3 is different from a width W1 of the first side end portion 1082 along the third axis AX3. When viewed along the first axis AX1, the width W2 of the second side end portion 1083 along the third axis AX3 is greater than the width W1 of the first side end portion 1082 along the third axis AX3.

As shown in FIG. 2 and FIG. 4, a third opening OP3 is formed on the second side end portion 1083. When the movable part 108 is located at the first preset position and when viewed along the first axis AX1, the second opening OP2 overlaps the third opening OP3. In this embodiment, the size of the first opening OP1 is the same as the size of the second opening OP2, and the size of the third opening OP3 is larger than the size of the second opening OP2.

In this embodiment, as shown in FIG. 4, the second optical mechanism 200 has a second camera lens 202 corresponding to the first opening OP1, and the third optical mechanism 300 has a third camera lens 302 corresponding to the second opening OP2. When the movable part 108 is located at the first preset position and viewed along the first axis AX1, the second camera lens 202 and the third camera lens 302 are respectively exposed from the first opening OP1 and the second opening OP2.

When viewed along the first axis AX1, a distance LH3 between the first opening OP1 and the first bending portion 1021 along the second axis AX2 is different from a distance LH4 between the second opening OP2 and the second bending portion 1022 along the second axis AX2.

For example, when viewed along the first axis AX1, the distance LH3 between the first opening OP1 and the first bending portion 1021 along the second axis AX2 is smaller than the distance LH4 between the second opening OP2 and the second bending portion 1022 along the second axis AX2.

Furthermore, the movable part 108 may further include a first shading element SR1 and a second shading element SR2, which are respectively disposed on the first side end portion 1082 and the second side end portion 1083. The first shading element SR1 and the second shading element SR2 are made of light-absorbing material, such as black material.

As shown in FIG. 2, the second shading element SR2 is adjacent to the third opening OP3. As shown in FIG. 5, when the first movable part 108 is located at the second preset position and viewed along the first axis AX1, the first shading element SR1 and the second shading element SR2 respectively shade the first opening OP1 and the second opening OP2.

Figure 6:
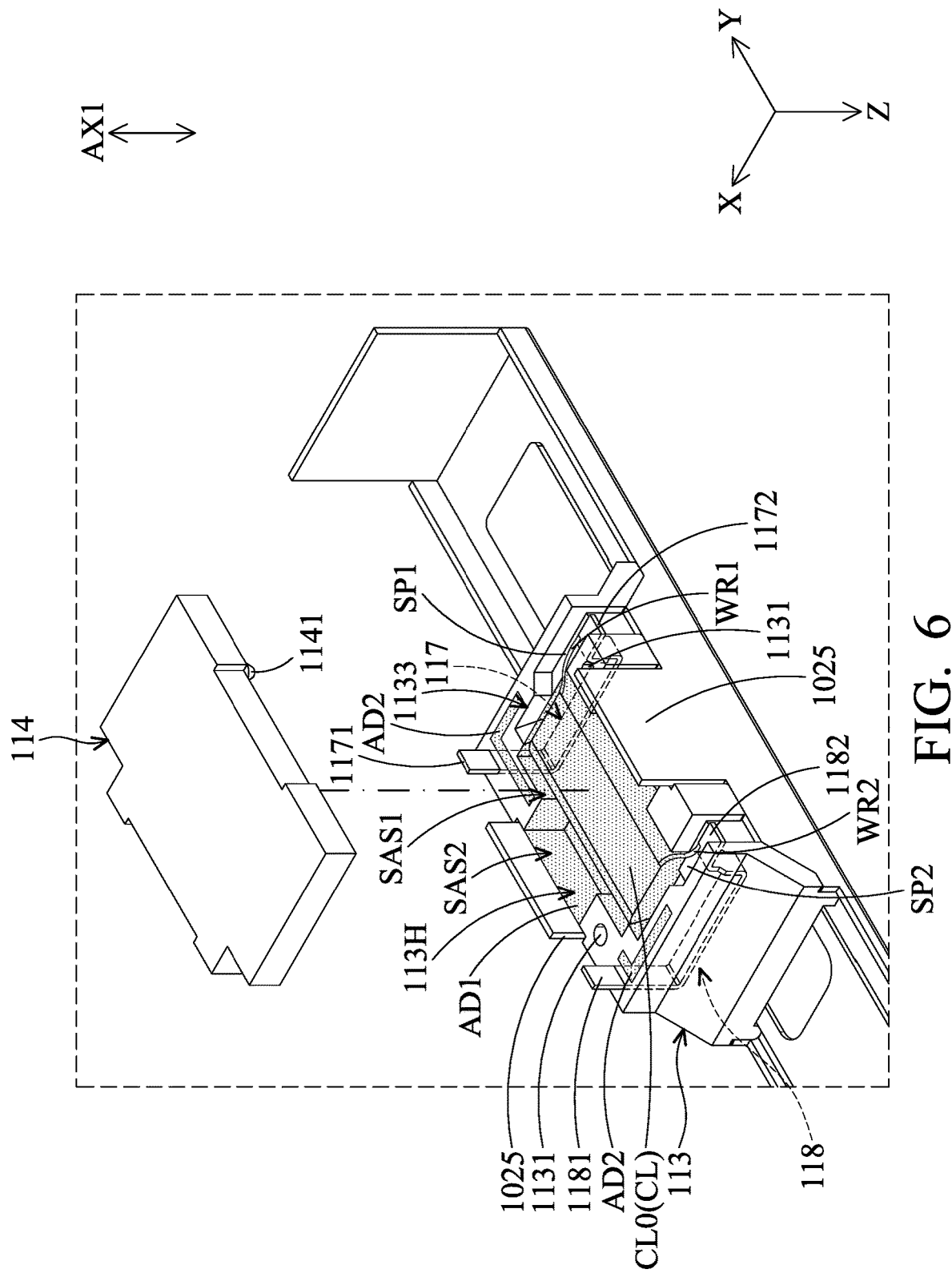
FIG. 6 is a three-dimensional exploded view of the first optical mechanism 100 in another view according to an embodiment of the present disclosure.
Figure 7:
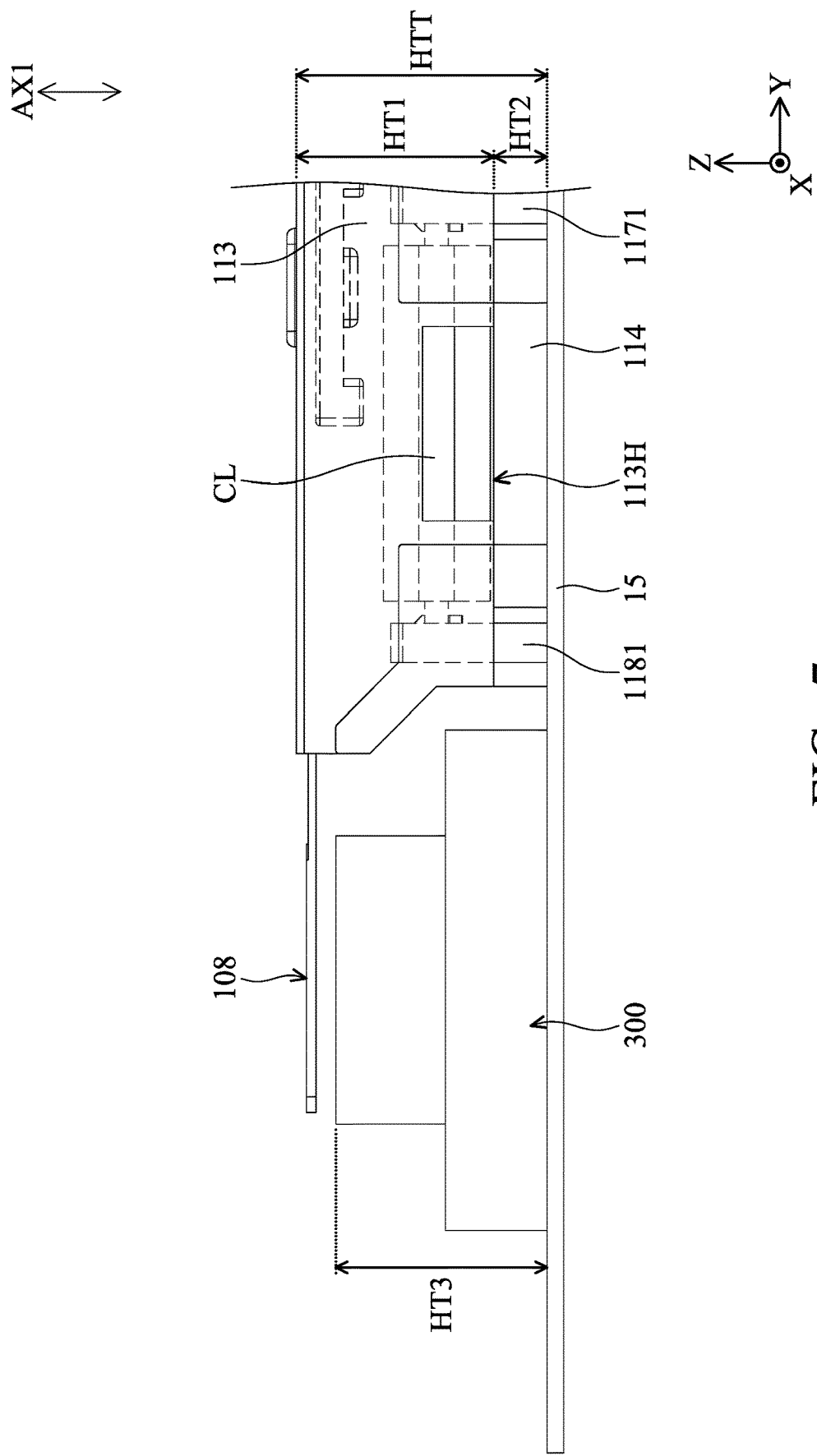
FIG. 7 is a side view of a partial structure of the first optical mechanism 100 according to an embodiment of the present disclosure.

Then please refer to FIG. 2, FIG. 6 and FIG. 7. FIG. 6 is a three-dimensional exploded view of the optical mechanism 100 in another view according to an embodiment of the present disclosure, and FIG. 7 is a side view of a partial structure of the optical mechanism 100 according to an embodiment of the present disclosure. As shown in FIG. 2 and FIG. 6, the base 112 includes the aforementioned first base body 113 and a second base body 114, and the first base body 113 is connected to the second base body 114 in a detachable manner.

Specifically, the first base body 113 forms a first coupling structure. The second base body 114 forms a second coupling structure corresponding to the first coupling structure. The first coupling structure is configured to be coupled to the second coupling structure so that the first base body 113 is fixedly connected to the second base body 114.

For example, the first coupling structure can be a positioning hole 1131, and the second coupling structure can be a positioning column 1141, but they are not limited thereto, and the two can be interchanged. The positioning column 1141 is configured to be inserted into the positioning hole 1131 so that the first base body 113 is combined with the second base body 114.

As shown in FIG. 7, when viewed along the third axis AX3, a total height HTT of the first base body 113 and the second base body 114 relative to the base plate 15 is greater than a height HT3 of the third optical mechanism 300 relative to the base plate 15. A height HT1 of the first base body 113 is smaller than the height HT3, and a height HT2 of the second base body 114 is smaller than the height HT3.

It is worth noting that the second base body 114 is a plate body and does not form any accommodating space for accommodating the coil CL. That is, when viewed along the third axis AX3, as shown in FIG. 7, the second base body 114 does not overlap the coil CL.

Moreover, as shown in FIG. 6, the first optical mechanism 100 further includes a first circuit member 117 and a second circuit member 118, which are disposed at the first base body 113. For example, the first circuit member 117 and the second circuit member 118 are formed at the first base body 113 by insert molding technology.

The first circuit member 117 may have a first electrical connection portion 1171 and a first welding portion 1172, and the first electrical connection portion 1171 and the first welding portion 1172 are exposed from the first base body 113. Similarly, the second circuit member 118 has a second electrical connection portion 1181 and a second welding portion 1182, and the second electrical connection portion 1181 and the second welding portion 1182 are exposed from the first base body 113.

When viewed along the first axis AX1, the first electrical connection portion 1171 and the first welding portion 1172 are located on both sides of the first base body 113. Similarly, when viewed along the first axis AX1, the second electrical connection portion 1181 and the second welding portion 1182 are located on both sides of the first base body 113.

As shown in FIG. 7, a first leading end WR1 of the coil CL is configured to be connected to the first welding portion 1172 by welding, and a first heat-insulation portion SP1 is disposed between the first welding portion 1172 and a main body CLO of the coil CL. The first base body 113 is, for example, made of plastic material, and the first heat-insulation portion SP1 is a part of the first base body 113, separating the first welding portion 1172 from the main body CLO of the coil CL.

Similarly, a second leading end WR2 of the coil CL is connected to the second welding portion 1182 by welding, and a second heat-insulation portion SP2 is disposed between the second welding portion 1182 and the main body CLO of the coil CL. The second heat-insulation portion SP2 is also a part of the first base body 113, separating the second welding portion 1182 from the main body CLO of the coil CL.

The first heat-insulation portion SP1, the second heat-insulation portion SP2 and the first base body 113 are integrally formed as one piece and can be made of plastic material. Based on the structural configuration, it can avoid the problem of heat energy being directly transmitted from the first welding portion 1172 and the second welding portion 1182 to the main body CLO during welding and causing damage.

In addition, when the coil CL is disposed in the accommodating groove 1133, a first accommodating subspace SAS1 is formed between the main body CLO and the first base body 113, and the first optical mechanism 100 further includes a first adhesive element AD1 which is filled in the first accommodating subspace SAS1 and is configured to affix the main body CLO to the first base body 113. When viewed along the first axis AX1, the first adhesive element AD1 completely overlaps the main body CLO of the coil CL. That is, the first adhesive element AD1 completely covers the main body CLO.

The first optical mechanism 100 may further include a second adhesive element AD2 disposed between the first base body 113 and the second base body 114. The second adhesive element AD2 is configured to affix the first base body 113 to the second base body 114.

The thermal conductivity coefficient of the first adhesive element AD1 is different from the thermal conductivity coefficient of the second adhesive element AD2. For example, the first adhesive element AD1 is thermally conductive adhesive, and the second adhesive element AD2 is thermoset adhesive, but they are not limited thereto.

It is worth noting that the first base body 113 has two exposing portions 113H connected to the accommodating groove 1133. As shown in FIG. 7, when viewed along the third axis AX3, the coil CL overlaps the two exposing portions 113H. Furthermore, the outer frame 102 further has two connection structures 1025 extending along the first axis AX1. After the outer frame 102 covers the first base body 113, as shown in FIG. 6, the two connection structures 1025 cover the two exposing portions 113H.

After the outer frame 102 covers the first base body 113, a second accommodating subspace SAS2 is formed between the two connection structures 1025 and the main body CLO and is connected to the first accommodating subspace SAS1. The first adhesive element AD1 is also disposed in the second accommodating subspace SAS2 and contacts the two connection structures 1025.

Based on the design, the heat generated by the coil CL can be conducted to the two connection structures 1025 of the outer frame 102 through the first adhesive element AD1, and because the outer frame 102 can be made of a metal material, the heat can be quickly dissipated to the surrounding environment to avoid the overheating problems.

Figure 8:
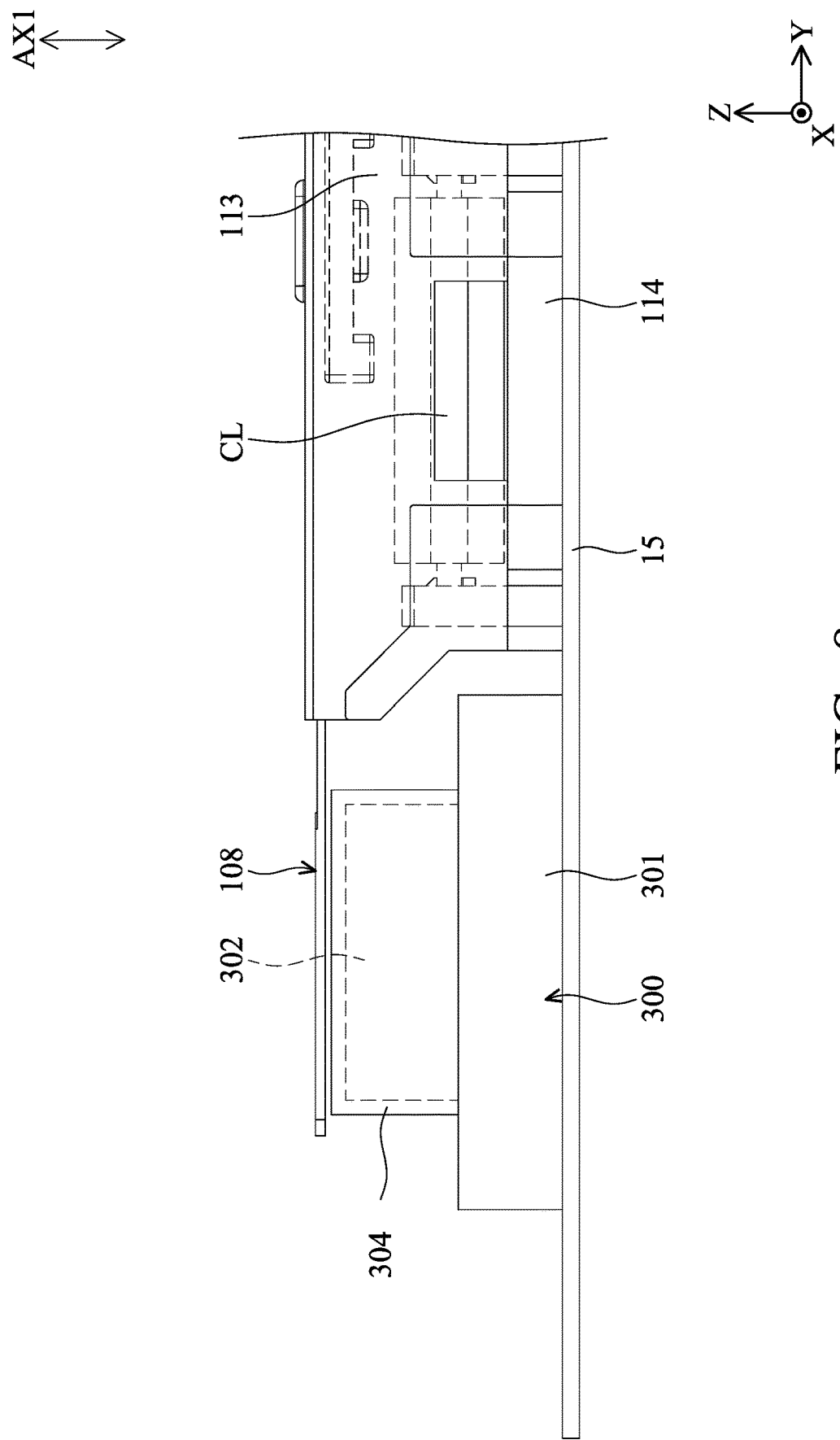
FIG. 8 is a side view of a partial structure of the first optical mechanism 100 according to another embodiment of the present disclosure.

Please refer to FIG. 8, which is a side view of a partial structure of the first optical mechanism 100 according to another embodiment of the present disclosure. In this embodiment, the third optical mechanism 300 may include a third base 301, and the third camera lens 302 is disposed on the third base 301 and located between the movable part 108 and the third base 301.

Furthermore, in this embodiment, the third optical mechanism 300 further includes a supporting member 304 disposed on the third base 301 and configured to support the movable part 108. The supporting member 304 may have a ring structure and is sheathed on the third camera lens 302, and the supporting member 304 is made of a light-absorbing material.

Based on the configuration of the supporting member 304, the problem that the length of the movable part 108 is too long and sags to collide with the third camera lens 302 can be avoided. It should be noted that the height of the supporting member 304 is greater than the height of the third camera lens 302, but there is a gap between the supporting member 304 and the movable part 108. In addition, the supporting member 304 can be made of a smooth material, so as to avoid the problem that the movable part 108 is affected by too much friction when the movable part 108 contacts the supporting member 304 and affects the movement of the movable part 108.

The present disclosure provides an optical system, including a first optical mechanism 100, a second optical mechanism 200 and a third optical mechanism 300, and the outer frame 102 of the first optical mechanism has a first opening OP1 and a second opening OP2 respectively corresponding to the second optical mechanism 200 and third optical mechanism 300. In some embodiments, the driving assembly DA of the first optical mechanism 100 can drive the movable part 108 to move to selectively shield or not shield the first opening OP1 and the second opening OP2 at the same time.

In some embodiments, the base 112 of the first optical mechanism 100 can include a first base body 113 and a second base body 114. The second base body 114 can increase the height of the first base body 113 relative to the base plate 15, so that the first optical mechanism 100 is suitable for a higher camera lens module (such as the third optical mechanism 300).

In addition, the first base body 113 has two exposing portions 113H. When the outer frame 102 is covered on the first base body 113, the first adhesive element AD1 can be connected to the two connection structures 1025 of the outer frame 102 through the two exposing portions 113H. Based on this design, the heat generated by the coil CL can be conducted to the outer frame 102 made of metal through the first adhesive element AD1, so as to achieve the advantage of rapid heat dissipation.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
a first optical mechanism, comprising:
  a movable part;
  a fixed assembly, wherein the movable part is movable relative to the fixed assembly; and
  a driving assembly, configured to drive the movable part to move relative to the fixed assembly;
a second optical mechanism; and
a third optical mechanism;
wherein when viewed along a first axis, a base of the fixed assembly is disposed between the second optical mechanism and the third optical mechanism;
the optical system further comprises a base plate, and the base of the first optical mechanism, the second optical mechanism and the third optical mechanism are fixedly disposed on the base plate and located on a same plane;
the fixed assembly further comprises an outer frame fixedly connected to the base;
when viewed along the first axis, the outer frame has a long strip-shaped structure extending along a second axis;
the outer frame has a base portion, a first bending portion and a second bending portion;
when viewed along a third axis, there is a gap between the first bending portion and the base plate;
the third axis is perpendicular to the first axis and the second axis; and
when viewed along the third axis, there is another gap between the second bending portion and the base plate.

2. The optical system as claimed in claim 1, wherein the fixed assembly comprises:
a first opening, configured to allow a first light beam to pass through to enter the second optical mechanism; and
a second opening, configured to allow a second light beam to pass through to enter the third optical mechanism;
wherein the first light beam is parallel to the second light beam;
the second optical mechanism comprises a camera module configured to capture an image;
the third optical mechanism comprises a depth-sensing module configured to measure distance;
when viewed along the first axis, the first opening and the second opening are arranged along the second axis;
the first axis is parallel to the first light beam; and
the second axis is perpendicular to the first axis.

3. The optical system as claimed in claim 2, wherein when viewed along the first axis, the driving assembly is located between the second optical mechanism and the third optical mechanism;
when viewed along the first axis, the third optical mechanism, the base and the second optical mechanism are arranged along the second axis in sequence; and
when viewed along the first axis, the fixed assembly has a long strip-shaped structure extending along the second axis.

4. The optical system as claimed in claim 3, wherein the base portion extends along the second axis;
the first bending portion and the second bending portion are formed on opposite ends along the second axis of the base portion; and
the first bending portion and the second bending portion extend along the first axis.

5. The optical system as claimed in claim 3, wherein the third optical mechanism further comprises a third camera lens and a third base;
the third camera lens is disposed on the third base and is located between the movable part and the third base;
the third optical mechanism further includes a supporting member disposed on the third base and configured to support the movable part;
the supporting member sheathes the third camera lens;
the supporting member has a ring structure; and
the supporting member is made of a light-absorbing material.

6. The optical system as claimed in claim 4, wherein the outer frame further has a first side portion and a second side portion;
the first side portion and the second side portion are formed on opposite sides along the third axis of the base portion; and
the first side portion and the second side portion extend along the second axis and are configured to strengthen a structural strength of the outer frame.

7. The optical system as claimed in claim 6, wherein the first bending portion and the base form a first accommodation space;
at least part of the second optical mechanism is located in the first accommodation space;
the second bending portion and the base form a second accommodation space; and
at least a part of the third optical mechanism is located in the second accommodation space.

8. The optical system as claimed in claim 7, wherein the base comprises a first base body and a second base body;
the first base body is connected to the second base body in a detachable manner;
the first base body forms a first coupling structure;
the second base body forms a second coupling structure corresponding to the first coupling structure;
the first coupling structure is configured to be coupled to the second coupling structure so that the first base body is fixedly connected to the second base body;
the first coupling structure comprises one of a positioning column and a positioning hole; and
the second coupling structure comprises the other one of the positioning column and the positioning hole.

9. The optical system as claimed in claim 8, wherein when viewed along the third axis, a total height of the first base body and the second base body relative to the base plate is greater than a height of the third optical mechanism relative to the base plate;
the driving assembly comprises:
a coil;
a magnetic element, corresponding to the coil; and
a magnetically conductive element corresponding to the coil and having a magnetically conductive material;
wherein the coil surrounds the magnetically conductive element;

the magnetically conductive element has a plate-shaped structure and is parallel to the second axis;
the first base body further has an accommodating groove configured to accommodate the magnetically conductive element and the coil; and
when viewed along the third axis, the second base body does not overlap the coil.

10. The optical system as claimed in claim 9, wherein
the first optical mechanism further comprises a first circuit member and a second circuit member which are disposed at the first base body;
the first circuit member has a first electrical connection portion and a first welding portion;
the first electrical connection portion and the first welding portion are exposed from the first base body;
the second circuit member has a second electrical connection portion and a second welding portion;
the second electrical connection portion and the second welding portion are exposed from the first base body;
when viewed along the first axis, the first electrical connection portion and the first welding portion are located on both sides of the first base body; and
when viewed along the first axis, the second electrical connection portion and the second welding portion are located on both sides of the first base body.

11. The optical system as claimed in claim 9, wherein
when the movable part is located at a first preset position relative to the fixed assembly and when viewed along the first axis, the movable part does not overlap with the first opening;
when the movable part is located at the first preset position and when viewed along the first axis, the movable part does not overlap the second opening;
the movable part includes a holding portion, a first side end portion and a second side end portion;
the holding portion is configured to hold the magnetic element;
when viewed along the first axis, the holding portion is connected between the first side end portion and the second side end portion; and
when viewed along the first axis, the driving assembly is located between the first opening and the second opening.

12. The optical system as claimed in claim 11, wherein
when viewed along the first axis, a length of the second side end portion along the second axis is different from a length of the first side end portion along the second axis;
when viewed along the first axis, the length of the second side end portion along the second axis is greater than the length of the first side end portion along the second axis;
when viewed along the first axis, a width of the second side end portion along the third axis is different from a width of the first side end portion along the third axis; and
when viewed along the first axis, the width of the second side end portion along the third axis is greater than the width of the first side end portion along the third axis.

13. The optical system as claimed in claim 12, wherein
a third opening is formed on the second side end portion;
when the movable part is located at the first preset position and when viewed along the first axis, the second opening overlaps the third opening;
a size of the first opening is the same as a size of the second opening;
a size of the third opening is larger than the size of the second opening;
the second optical mechanism has a second camera lens corresponding to the first opening; and
the third optical mechanism has a third camera lens corresponding to the second opening.

14. The optical system as claimed in claim 13, wherein
when viewed along the first axis, a distance between the first opening and the first bending portion along the second axis is different from a distance between the second opening and the second bending portion along the second axis; and
when viewed along the first axis, the distance between the first opening and the first bending portion along the second axis is smaller than the distance between the second opening and the second bending portion along the second axis.

15. The optical system as claimed in claim 14, wherein
when the movable part is located at a second preset position relative to the fixed assembly and when viewed along the first axis, the movable part overlaps the first opening;
when the first movable part is located at the second preset position and when viewed along the first axis, the movable part overlaps the second opening;
the movable part further includes a first shading element and a second shading element respectively disposed on the first side end portion and the second side end portion;
the first shading element and the second shading element are made of light-absorbing material;
the second shading element is adjacent to the third opening; and
when the first movable part is located at the second preset position and viewed along the first axis, the first shading element and the second shading element respectively cover the first opening and the second opening.

16. The optical system as claimed in claim 10, wherein
a first leading end of the coil is configured to connect to the first welding portion;
a first heat-insulation portion is disposed between the first welding portion and a main body of the coil;
a second leading end of the coil is configured to connect to the second welding portion;
a second heat-insulation portion is disposed between the second welding portion and the main body of the coil; and
the first heat-insulation portion, the second heat-insulation portion and the first base body are integrally formed as one piece.

17. The optical system as claimed in claim 16, wherein
when the coil is disposed in the accommodating groove, a first accommodating subspace is formed between the main body and the first base body;
the first optical mechanism further comprises a first adhesive element filled in the first accommodating subspace configured to affix the main body to the first base body; and
when viewed along the first axis, the first adhesive element completely overlaps the main body of the coil.

18. The optical system as claimed in claim 17, wherein
the first optical mechanism further comprises a second adhesive element disposed between the first base body and the second base body;
the second adhesive element is configured to affix the first base body to the second base body; and a thermal conductivity coefficient of the first adhesive element is different from a thermal conductivity coefficient of the second adhesive element.

19. The optical system as claimed in claim 18, wherein the first base body further has two exposing portions connected to the accommodating groove;

when viewed along the third axis, the coil overlaps the two exposing portions;

the outer frame further has two connection structures extending along the first axis; and after the outer frame covers the first base body, the two connection structures cover the two exposing portions.

20. The optical system as claimed in claim 19, wherein after the outer frame covers the first base body, a second accommodating subspace is formed between the two connection structures and the main body and is connected to the first accommodating subspace; and the first adhesive element is disposed in the second accommodating subspace and contacts the two connection structures.

\* \* \* \* \*